United States Patent
Lee et al.

(10) Patent No.: US 9,895,975 B2
(45) Date of Patent: Feb. 20, 2018

(54) BAR TYPE DISPLAY APPARATUS AND VEHICLE COMPRISING THE SAME

(71) Applicant: LG Display Co., Ltd., Seoul (KR)

(72) Inventors: Kyong Taik Lee, Seoul (KR); Jung Hee Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 36 days.

(21) Appl. No.: 15/173,385

(22) Filed: Jun. 3, 2016

(65) Prior Publication Data

US 2016/0355091 A1 Dec. 8, 2016

Related U.S. Application Data

(60) Provisional application No. 62/171,956, filed on Jun. 5, 2015.

(30) Foreign Application Priority Data

Jun. 30, 2015 (KR) .......................... 10-2015-0093846

(51) Int. Cl.
*B60K 35/00* (2006.01)
*B60R 1/00* (2006.01)
*B60R 11/02* (2006.01)
*B60R 11/00* (2006.01)

(52) U.S. Cl.
CPC ................ *B60K 35/00* (2013.01); *B60R 1/00* (2013.01); *B60R 11/0229* (2013.01); *B60K 2350/945* (2013.01); *B60R 2011/0005* (2013.01); *B60R 2300/205* (2013.01)

(58) Field of Classification Search
CPC .... B60K 35/00; B60K 2350/945; B60R 1/00; B60R 2300/205; B60R 11/0229; B60R 2011/0005
See application file for complete search history.

(56) References Cited

U.S. PATENT DOCUMENTS

2016/0103319 A1* 4/2016 Remillard .............. G02B 27/01
345/1.3

\* cited by examiner

*Primary Examiner* — Yuen H Wong
(74) *Attorney, Agent, or Firm* — Fenwick & West LLP

(57) ABSTRACT

Disclosed is a bar type display apparatus which is capable of providing various information without obstructing a front view of a driver, and a vehicle comprising the same, wherein the bar type display apparatus may include a display module provided on a dashboard and disposed adjacent to a lower portion of a front glass of a vehicle, wherein the display module extends from one edge of the dashboard to the other edge of the dashboard.

13 Claims, 14 Drawing Sheets

BAR TYPE DISPLAY APPARATUS AND VEHICLE COMPRISING THE SAME

CROSS REFERENCE TO RELATED APPLICATIONS

This application claims the benefit of U.S. Provisional Application No. 62/171,956, filed on Jun. 5, 2015, and Republic of Korea Patent Application No. 10-2015-0093846, filed on Jun. 30, 2015, which are hereby incorporated by reference as if fully set forth herein.

BACKGROUND

Field of the Disclosure

Embodiments of the present invention relate to a bar type display apparatus and a vehicle comprising the same.

Discussion of the Related Art

With a recent advancement of electronic technology, various electronic devices enabling driving stability and driver's convenience have been studied. For example, a head-up display apparatus has been developed, which is capable of displaying information needed for a vehicle driving without dispersion of a driver's gaze. Recently, a method of displaying augmented reality-based information on a screen of the head-up display apparatus has been studied.

FIG. 1 illustrates a related art head-up display apparatus. Referring to FIG. 1, the related art head-up display apparatus projects information 30 needed for a vehicle driving on a front glass 40 through an image projection apparatus 20 disposed on a driver seat dashboard 10, and provides the information 30 to a driver. In this case, the image projection apparatus 20 expands the image for displaying through an internal mirror reflection, and projects the expanded image on the front glass 40.

However, the related art head-up display apparatus has the following disadvantages. First, the image is projected on a front viewing area of a driver, whereby the projected image may obstruct a front viewing angle of a driver, that is, it may serve as an obstacle of a safe driving. Thus, a driver cannot watch the front. Even though a driver watches the front, a viewing angle may be restricted. Also, the projected image has low visibility in outdoor areas, which causes a lowering of information delivery. Accordingly, visibility may vary according to an external environment (weather, in case of operating the wiper). Furthermore, the related art image projection method may have a narrow viewing angle, a low resolution, and a low luminance.

SUMMARY

Accordingly, embodiments of the present invention are directed to a bar type display apparatus that substantially obviates one or more problems due to limitations and disadvantages of the related art, and a vehicle comprising the same.

An aspect of embodiments of the present invention is directed to provide a bar type display apparatus which is capable of providing various information without obstructing a front viewing angle of a driver, and a vehicle comprising the same.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there is provided a bar type display apparatus that may include a display module provided on a dashboard and disposed adjacent to a lower portion of a front glass of a vehicle, wherein the display module may extend from one edge of the dashboard to the other edge of the dashboard.

In another aspect of the embodiments of the present invention, there is provided a display module which may have a maximum short side length of 200 mm, and a long side length corresponding to 3 times to 10 times of the short side length.

In another aspect of the embodiments of the present invention, there is provided a vehicle that may include a bar type display apparatus provided on a dashboard and disposed adjacent to a lower portion of a front glass, wherein the bar type display apparatus may include a display module extending from one edge of the dashboard to the other edge of the dashboard.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of embodiments of the invention and are incorporated in and constitute a part of this application, illustrate embodiment(s) of the invention and together with the description serve to explain the principle of embodiments of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Hereinafter, a bar type display apparatus according to the embodiment of the present invention and a vehicle comprising the same will be described in detail with reference to the accompanying drawings. Wherever possible, the same reference numbers will be used throughout the drawings to refer to the same or like parts. Also, in the following description of the present invention, if detailed description of elements or functions known in respect of the present invention is determined to make the subject matter of the present invention unnecessarily obscure, the detailed description will be omitted.

Figure 1:
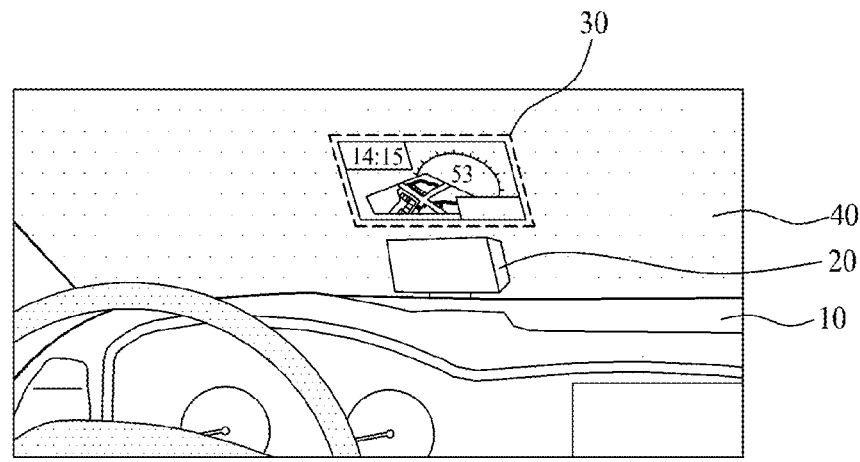
FIG. 1 illustrates a related art head-up display apparatus.
Figure 2:
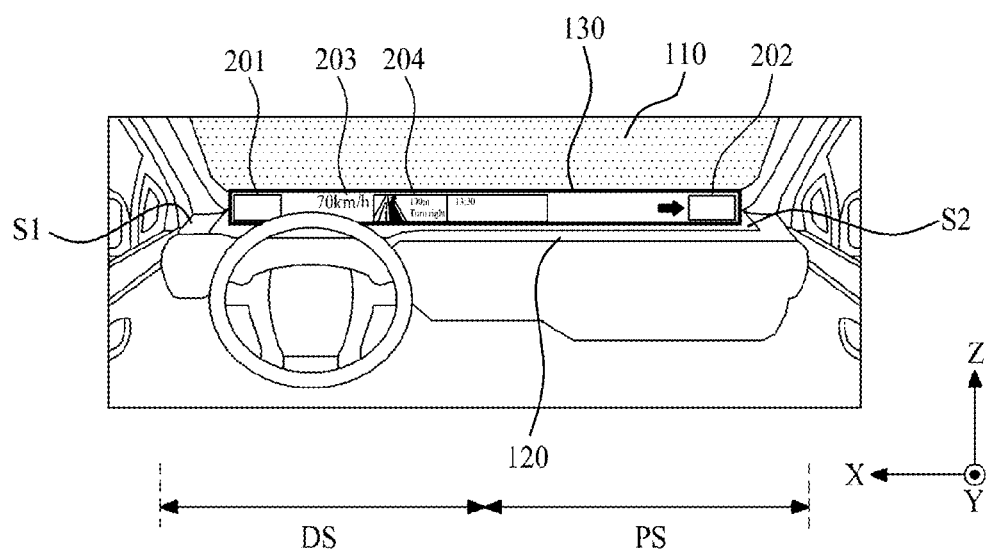
FIG. 2 illustrates the interior of a vehicle with a bar type display apparatus according to one embodiment of the present invention.
Figure 3:
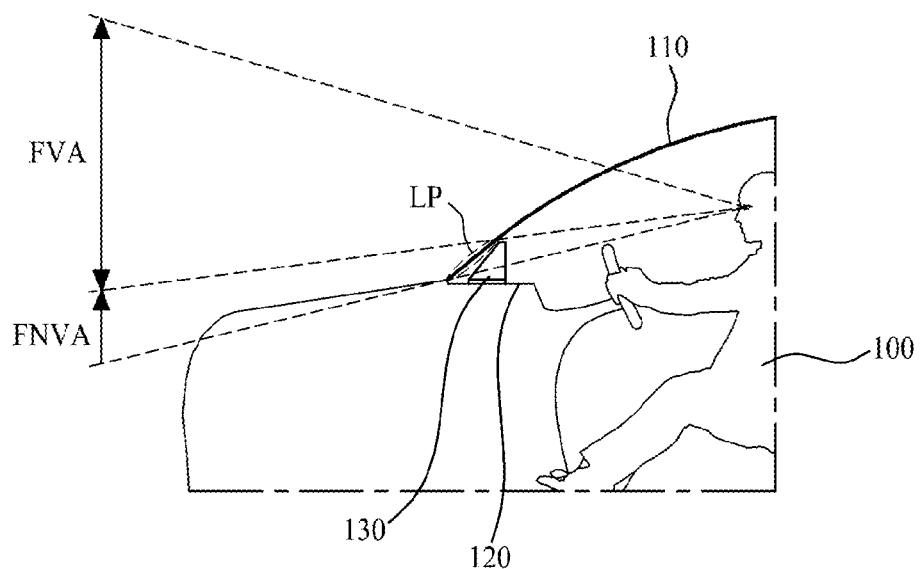
FIG. 3 illustrates a front viewing angle of a general driver.

FIG. 2 illustrates the interior of a vehicle with a bar type display apparatus according to one embodiment of the present invention. FIG. 3 illustrates a front viewing angle of a general driver. Referring to FIGS. 2 and 3, the vehicle with a bar type display apparatus according to one embodiment of the present invention may include a bar type display apparatus 130 provided on a dashboard 120. The bar type display apparatus 130 is disposed close to a lower portion (LP) of a front glass (or windshield) 110.

The bar type display apparatus 130 is prepared from one edge (S1) of the dashboard 120 to the other edge (S2) of the dashboard 120. That is, the bar type display apparatus 130 is prepared over a front driver seat (DS) and a front passenger seat (PS).

The bar type display apparatus 130 is disposed in a front non viewing angle area (FNVA) between the dashboard 120 and the lower portion (LP) of the front glass 110 so that it is possible to prevent a front viewing area (FVA) of a driver 100 from being obstructed by the bar type display apparatus 130. That is, the bar type display apparatus 130 is disposed in a dead space of the interior of the vehicle so as to prevent visibility of a driver 100 from being obstructed by the bar type display apparatus 130, whereby it makes better use of a space inside the vehicle.

Figure 4A:
FIGS. 4A and 4B illustrate vertical and horizontal viewing angles of a general driver.
Figure 4B:
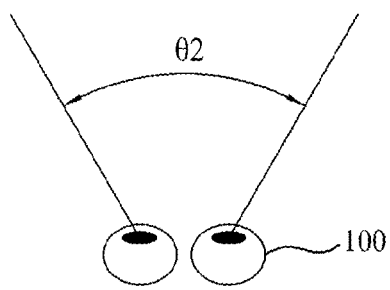

Generally, a typical person has a viewing angle of 30° in an up-and-down direction ($\theta 1$, referred to as 'vertical viewing angle') as shown in FIG. 4A, and has a viewing angle of 60° in a left-and-right direction ($\theta 2$, referred to as 'horizontal viewing angle') as shown in FIG. 4B. For example, in USA/Canada, with respect to a comfortable viewing angle on a reference plane, in case of a front vertical viewing angle, an upper viewing angle is about 28°, and a lower viewing angle is about 15°. Also, when one eye gazes at front without blinking, a possible vertical viewing angle is about average 44°, and a well-focused area is about 30°.

Figure 5A:
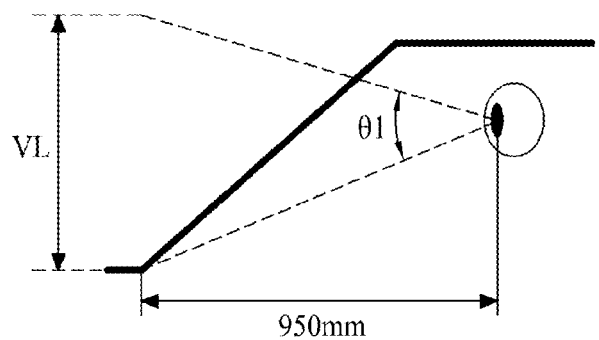
FIGS. 5A to 5C illustrate a comfortable viewing angle area of a general driver.
Figure 5B:
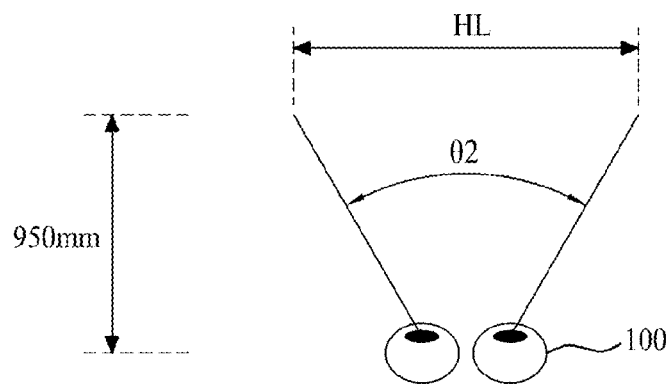

Generally, an average distance from a driver 100 to the front glass 110 is about 950 mm. With respect to the average distance, if a vertical viewing angle ($\theta 1$) of a driver 100 is 30°, as shown in FIG. 5A, a vertical length (VL) is about 310 mm. As shown in FIG. 5B, if a horizontal viewing angle ($\theta 2$) of a driver 100 is about 60°, a horizontal length (HL) is about 1160 mm. Accordingly, a comfortable viewing area according to the viewing angle of a driver 100 may have a horizontal length (HL) of 1160 mm, and a vertical length (VL) of 310 mm. Accordingly, the bar type display apparatus 130 according to the embodiment of the present invention may have a long side length (HL) of 1160 mm, and a short side length (VL) of 310 mm. In this case, it cannot satisfy a front visibility range of a driver 100, and it precludes a safe driving of a driver 100 by obstructing the front viewing area (FVA) of a driver 100, as shown in FIG. 7.

Figure 6:
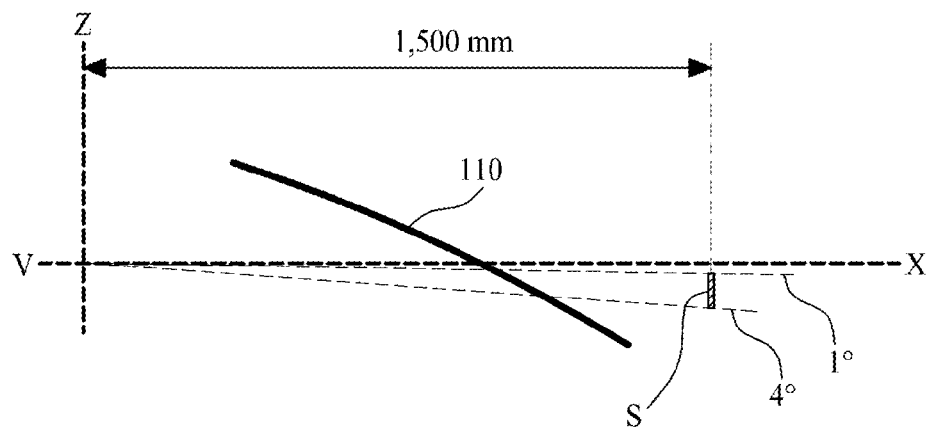
FIG. 6 illustrates a front visibility range of a driver based on Motor Vehicle Safety Standard Rules.

The front visibility range of driver is prescribed in Item 3 of Article 94 of Korean Motor Vehicle Safety Standard Rules, wherein obstacles except a windshield separation support, an outside radio antenna, a driving mirror and a wiper are not provided within the front visibility range of driver. However, an apparatus of displaying or projecting driving information, parts projected by the apparatus, a steering handle and a dashboard may be disposed within 20% of a range prescribed in Item 4. Herein, the range prescribed in Item 4 of Article 94 of Korean Motor Vehicle Safety Standard Rules, as shown in FIG. 6, corresponds to a space between a lower portion of a face which is downwardly at 1° with a face being in perpendicular to X-Z face and crossing V point and an upper portion of a face which is upwardly at 4° with a face being in perpendicular to X-Z face and crossing V point.

Figure 5C:
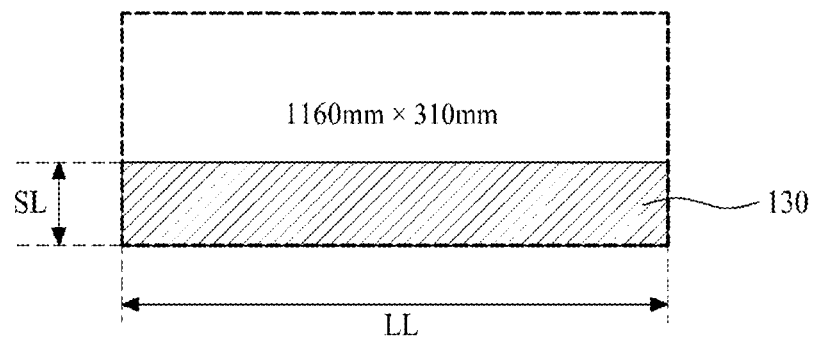
Figure 7:
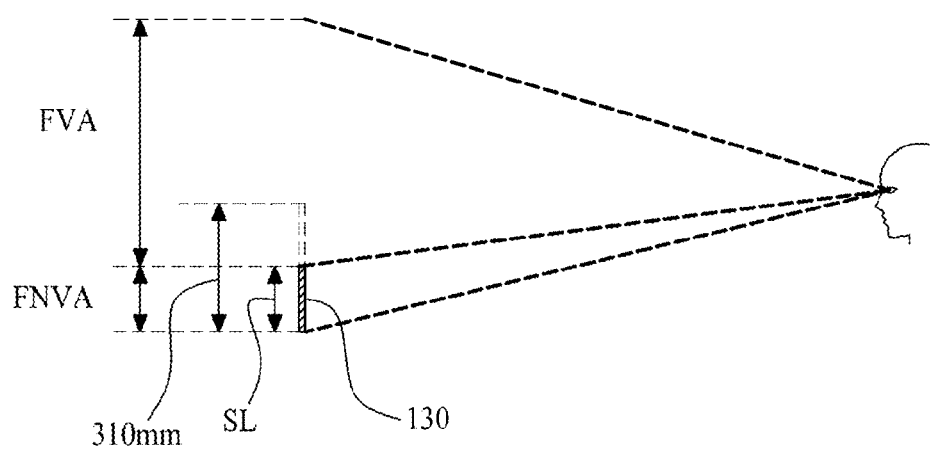
FIG. 7 illustrates a short side length of the bar type display apparatus according to one embodiment of the present invention.

As shown in FIGS. 5C and 7, the bar type display apparatus 130 according to the embodiment of the present invention satisfies the front visibility range of driver, and has a short side length (SL) and a long side length (LL) which are preset not to obstruct the front viewing area (FVA). The bar type display apparatus 130 according to the embodiment of the present invention is disposed at the lower portion (LP) of the front glass 110, that is, the front non viewing angle area (FNVA) between the lower portion (LP) of the front glass 110 and the dashboard 120, so that it is possible to satisfy the front visibility range of driver, and also to display various information needed for the driving of a driver 100 without obstructing the front viewing area (FVA) of a driver 100.

Figure 8:
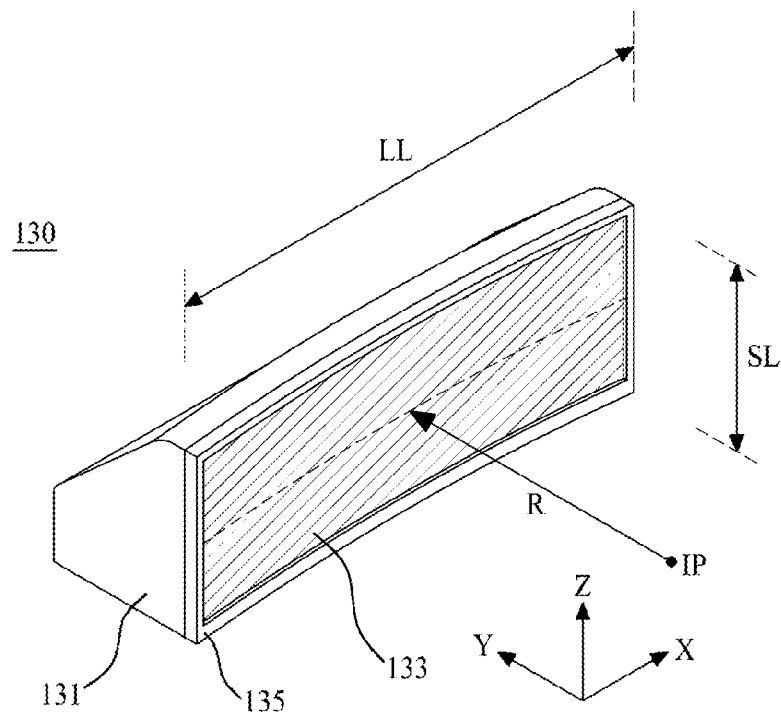
FIG. 8 is a perspective view illustrating the bar type display apparatus according to one embodiment of the present invention.
Figure 9:
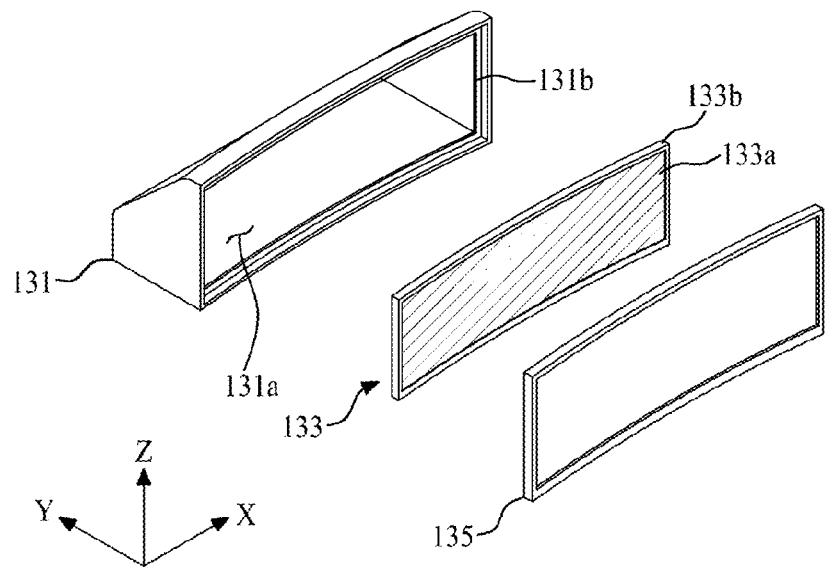
FIG. 9 is an exploded perspective view illustrating the bar type display apparatus according to one embodiment of the present invention.

FIG. 8 is a perspective view illustrating the bar type display apparatus according to one embodiment of the present invention. FIG. 9 is an exploded perspective view illustrating the bar type display apparatus according to one embodiment of the present invention.

Referring to FIGS. 2, 8 and 9, the bar type display device according to one embodiment of the present invention has the long and short sides.

The maximum short side length (SL) of the bar type display apparatus 130 is set to be 200 mm, the minimum long side length (LL) of the bar type display apparatus 130 is set to be at least 3 times of the short side length (SL), and the maximum long side length (LL) is set to be less than a length of the lower portion (LP) of the front glass 110 within a range capable of being provided on an upper surface of the dashboard 120. In this case, if the maximum short side length (SL) of the bar type display apparatus 130 is more than 200 mm, as shown in FIG. 7, the aforementioned front visibility range of a driver 100 is not satisfied, and the front viewing area (FVA) of a driver 100 is obstructed.

The bar type display apparatus 130 according to one embodiment of the present invention may have the maximum short side length (SL) of 200 mm, and the maximum long side length (LL) which is set to be 3 times to 10 times of the short side length (SL). In more detail, the bar type display apparatus 130 according to one embodiment of the present invention may have the maximum short side length (SL) of 150 mm, and the maximum long side length (LL) which is set to be 7 times to 10 times of the short side length (SL).

The bar type display apparatus 130 according to one embodiment of the present invention may include a housing 131, a display module 133, and a front cover 135.

The housing 131, which is prepared on the upper surface of the dashboard 120, receives the display module 133 therein. To this end, the housing 131 is formed in a case shape having a receiving space 131a whose front side facing the driving seat (DS) is opened. A module support face 131b having a step shape is prepared along a front edge of the receiving space 131a.

As shown in FIG. 2, the display module 133 extends from one edge (S1) of the dashboard 120 to the other edge (S2) of the dashboard 120. That is, the display module 133 extends over the front driver seat (DS) and the front passenger seat (PS). In case of the display module 133, the maximum short side length (SL) is set to be 200 mm, the minimum long side length (LL) is set to be at least 3 times of the short side length (SL), and the maximum long side length (LL) is set to be less than a length of the lower portion (LP) of the front glass 110 within a range capable of being provided on the upper surface of the dashboard 120. According to one embodiment of the present invention, the display module 133 may have the maximum short side length (SL) of 200 mm, and the maximum long side length (LL) which is set to be 3 times to 10 times of the short side length (SL). The display module 133 is received in the receiving space 131a of the housing 131. An image supplied from a host system (not shown) is displayed on the display module 133.

The display module 133 according to one example of the present invention may be a liquid crystal display module. For example, the liquid crystal display module may include a liquid crystal display panel 133a, a backlight unit (not shown) for emitting light to a rear surface of the liquid crystal display panel 133a, a guide frame (not shown) for supporting the liquid crystal display panel 133a, a rear case (not shown) for receiving the backlight unit and supporting the guide frame, and a front case 133b for covering a front edge of the liquid crystal display panel 133a and a lateral side of the rear case.

The display module 133 according to another example of the present invention may be an organic light emitting display module. For example, the organic light emitting display module may include an organic light emitting display panel 133a, a guide frame (not shown) for supporting the organic light emitting display panel 133a, a rear case (not shown) for receiving the guide frame therein, and a front case 133b for covering a front edge of the organic light emitting display panel 133a and a lateral side of the rear case.

Additionally, the display module 133 is convexly bent toward the front glass 110 so as to improve the viewing angle of a driver 100. That is, the long side length (LL) of the display module 133 has a concavely-bent screen with a preset curvature (R) with respect to an imaginary point (IP). In other words, the display module 133 has a concave screen.

The display module 133 directly displays an image through the use of liquid crystal display panel or organic light emitting display panel. Thus, in comparison to a related art image projection method, the display module 133 according to the embodiment of the present invention enables improved outside visibility, wider viewing angle and better resolution and luminance, so that it is possible to realize superior information delivery and to minimize visibility based on environmental impact (weather, in case of operating the wiper).

The front cover 135 in a quadrangle band shape covers the front edge and lateral sides of the display module 133. In this case, the front cover 135 is bent with a curvature which is the same as the curvature of the display module 133 concavely bent toward the front glass 110, whereby it is possible to maintain the bending state of the concavely-bent display module 133.

The host system collects information supplied from at least one of outside camera (not shown), driving image recording apparatus (not shown), navigation apparatus (not shown), mobile terminal (not shown), audio apparatus (not shown) and vehicle driving recording apparatus (not shown), and displays the collected information on the screen of the display module 133.

Figure 10:
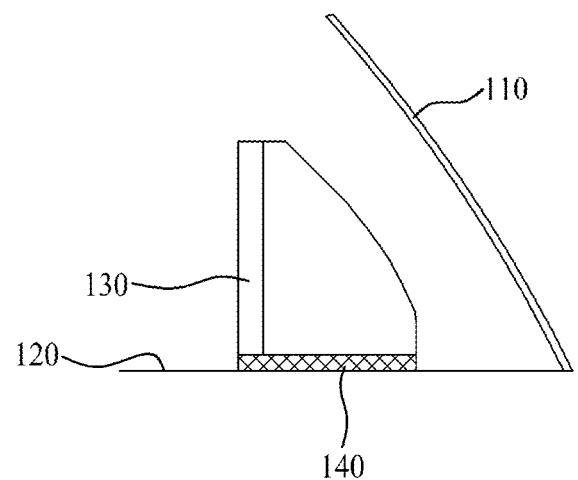
FIG. 10 illustrates a mounting member according to one example of the present invention.

FIG. 10 illustrates an installing structure of the bar type display apparatus according to one embodiment of the present invention. Referring to FIG. 10, the bar type display apparatus 130 according to the embodiment of the present invention may be disposed on the upper surface of the dashboard 120 overlapped with the lower portion of the front glass 110 by the use of mounting member 140.

The mounting member 140 according to one example may be a double-sided tape. In order to absorb an impact applied to the bar type display apparatus 130, it is preferable to provide a cushion type double-sided tape.

The mounting member 140 according to another example may includes at least one metal plate (not shown) disposed on the upper surface of the dashboard 120 overlapped with the lower portion of the front glass 110, and a magnetic member (not shown) adhered to a lower surface of the bar type display apparatus 130 and attached to the metal plate.

Figure 11:
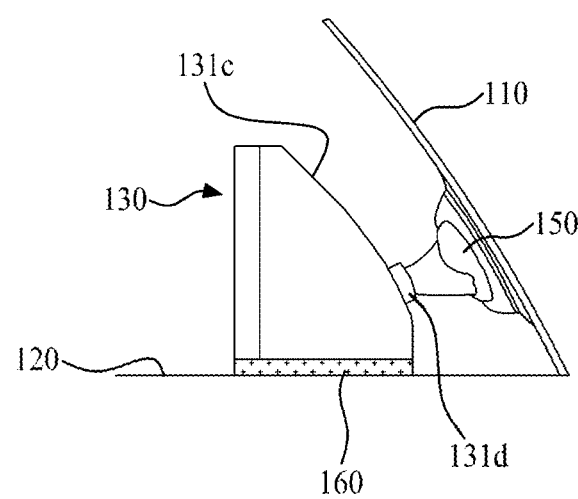
FIG. 11 illustrates an adhesion member according to one example of the present invention.

FIG. 11 illustrates an installing structure of the bar type display apparatus according to another embodiment of the present invention. Referring to FIG. 11, the bar type display apparatus 130 according to the embodiment of the present invention may be attached to the lower portion of the front glass 110 by a plurality of adhesion members 150, and may be disposed on the upper surface of the dashboard 120. In this case, a plurality of holders 131d connected with a plurality of adhesion members 150 are prepared in the bar type display apparatus 130, that is, rear surface of the housing 131. A cushion-type absorbing member 160 may be interposed between the dashboard 120 and the lower surface of the bar type display apparatus 130.

Figure 12A:
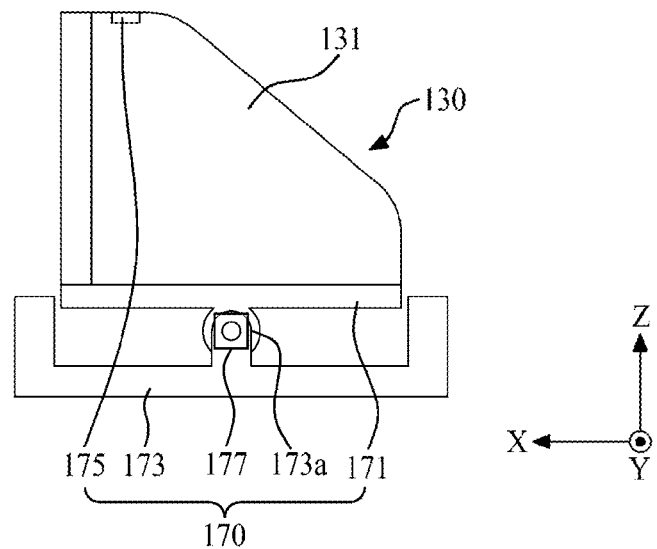
FIGS. 12A and 12B illustrate a viewing angle control unit according to one example of the present invention in the bar type display apparatus according to the embodiment of the present invention.
Figure 12B:
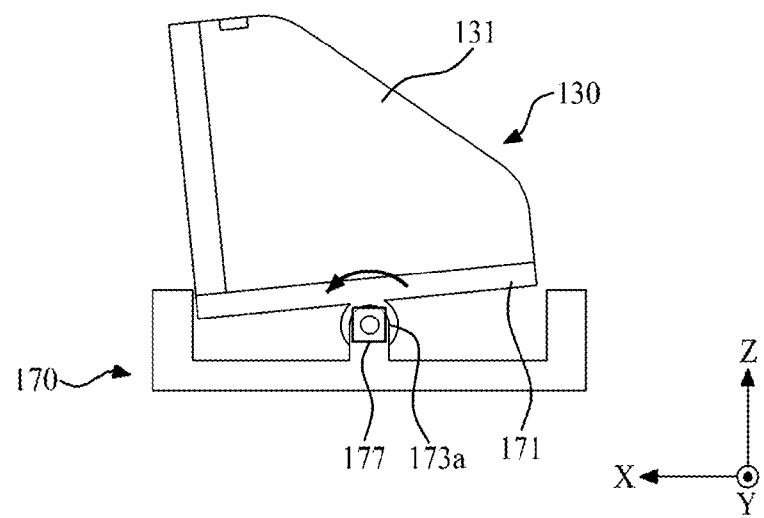

FIGS. 12A and 12B illustrate a viewing angle control unit according to one example in the bar type display apparatus according to the embodiment of the present invention. Referring to FIGS. 12A and 12B, the viewing angle control unit 170 according to one example controls the vertical viewing angle of the bar type display apparatus 130 by tilting the bar type display apparatus 130. The viewing angle control unit 170 according to one example may include a plate 171 for supporting the bar type display apparatus 130, a receiving frame 173 in the dashboard 120 for receiving the plate 171, an illumination sensor 175 in the bar type display apparatus 130 for sensing an outside illumination, and a driving member 177 for tilting the plate 171 based on the illumination sensed by the illumination sensor 175.

The plate 171 is connected with the bar type display apparatus 130, that is, the lower surface of the housing 131, and the plate 171 is rotatably supported on the receiving frame 173.

The receiving frame 173 is provided in the dashboard 120 overlapped with the bar type display apparatus 130, and the receiving frame 173 receives the driving member 177 and supports the rotatably-provided plate 171. In this case, the plate 171 is rotatably connected with a hinge member 173a prepared in the receiving frame 173.

The illumination sensor 175 is provided in the bar type display apparatus 130, that is, the upper surface of the housing 131 or upper portion of the rear surface of the housing 131, to thereby sense an illumination outside the vehicle.

The driving member 177 is a driving motor, wherein the driving member 177 tilts the plate 171 according to the illumination sensed by the illumination sensor 175, to thereby improve the vertical viewing angle of the bar type display apparatus 130. That is, the driving member 177 is controlled by a motor controller (not shown). If the illumination sensed by the illumination sensor 175 is more than a predetermined reference value, for example, the outside of the vehicle is in the relatively-bright environment, the motor controller drives the driving member 177 so that an upper portion of the bar type display apparatus 130 is tilted toward the driving seat, to thereby overcome a problem relating a lowering of the vertical viewing angle. Meanwhile, if the illumination sensed by the illumination sensor 175 is less than the predetermined reference value, for example, the outside of the vehicle is in the relatively-dark environment, the motor controller drives the driving member 177 so that the bar type display apparatus 130 is restored to its original position being in a vertical standing position.

Figure 13A:
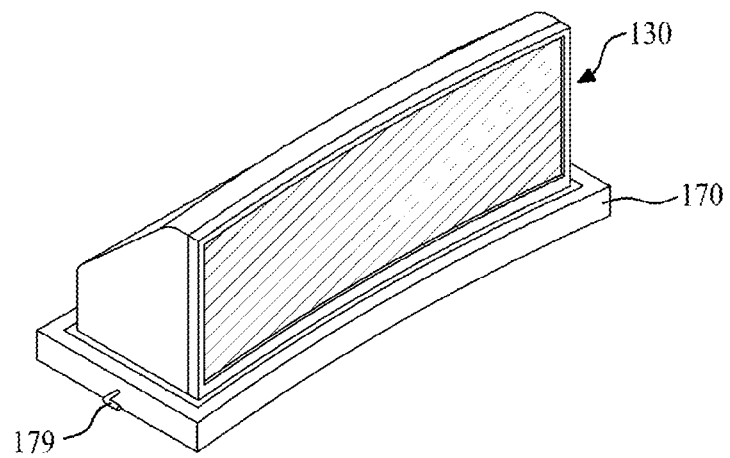
FIGS. 13A and 13B illustrate a viewing angle control unit according to another example of the present invention in the bar type display apparatus according to the embodiment of the present invention.
Figure 13B:
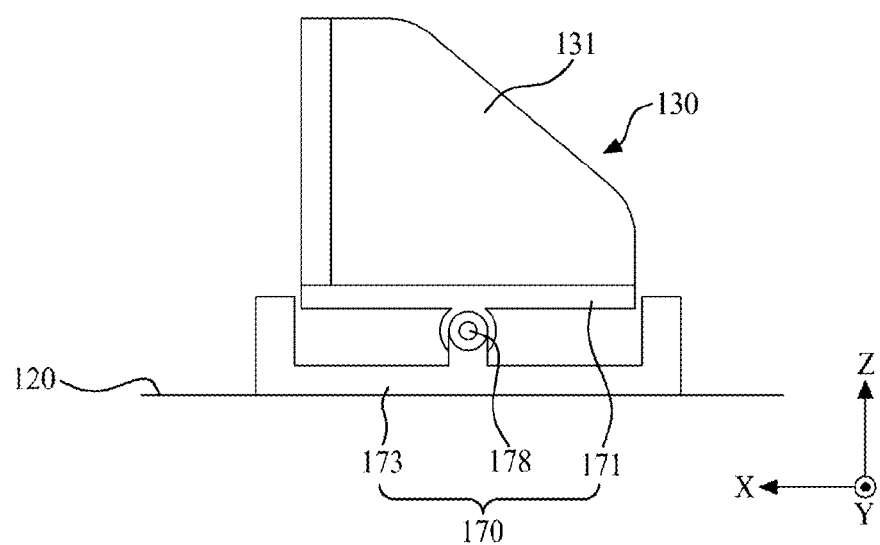

FIGS. 13A and 13B illustrate a viewing angle control unit according to another example in the bar type display apparatus according to the embodiment of the present invention. Referring to FIGS. 13A and 13B, the viewing angle control unit 170 according to another example may include a plate 171 for supporting the bar type display apparatus 130, a receiving frame 173 on the upper surface of the dashboard 120 for receiving the plate 171, a hinge member 178 for rotatably connecting the plate 171 and the receiving frame 173 with each other, and an operation lever 179 connected with the hinge member 178 through one surface of the receiving frame 173.

The plate 171 is connected with the bar type display apparatus 130, that is, the lower surface of the housing 131, and the plate 171 is rotatably supported on the receiving frame 173.

The receiving frame 173 is provided in the dashboard 120 overlapped with the bar type display apparatus 130, and the receiving frame 173 receives the driving member 177 therein.

The hinge member 178 is provided in a joint portion between the plate 171 and the receiving frame 173, whereby the plate 171 is rotatably supported by the hinge member 178.

The operation lever 179 is formed in 'L' shape, and is connected with the hinge member 178 through one surface of the receiving frame 173. The operation lever 179 rotates the plate 171 in accordance with a user's manual operation, whereby the vertical viewing angle of the bar type display apparatus 130 is controlled by a user.

Figure 14:
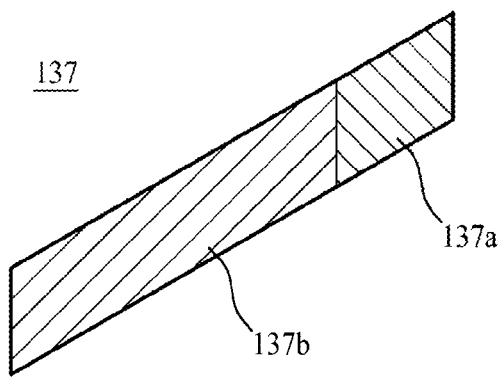
FIG. 14 illustrates a viewing angle blocking member in the bar type display apparatus according to one embodiment of the present invention.
Figure 15A:
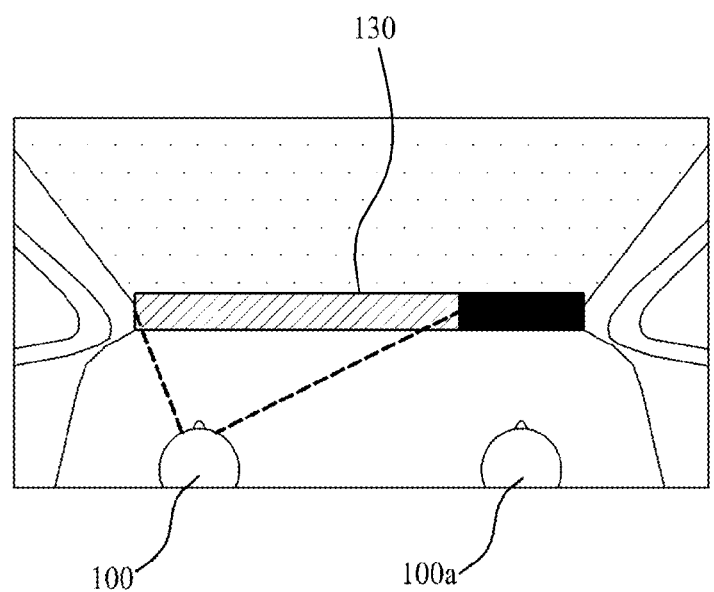
FIGS. 15A to 15C illustrate a viewing angle area and a viewing angle blocking area in each of a driver and a passenger by the viewing angle blocking member shown in FIG. 14.
Figure 15B:
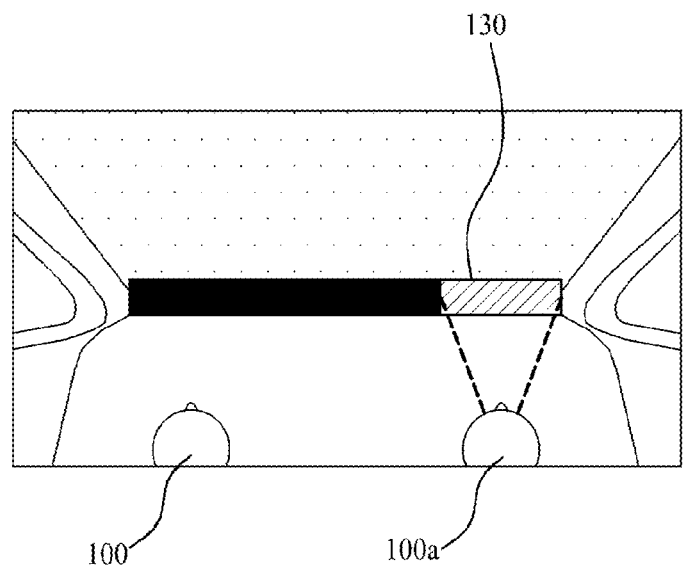
Figure 15C:
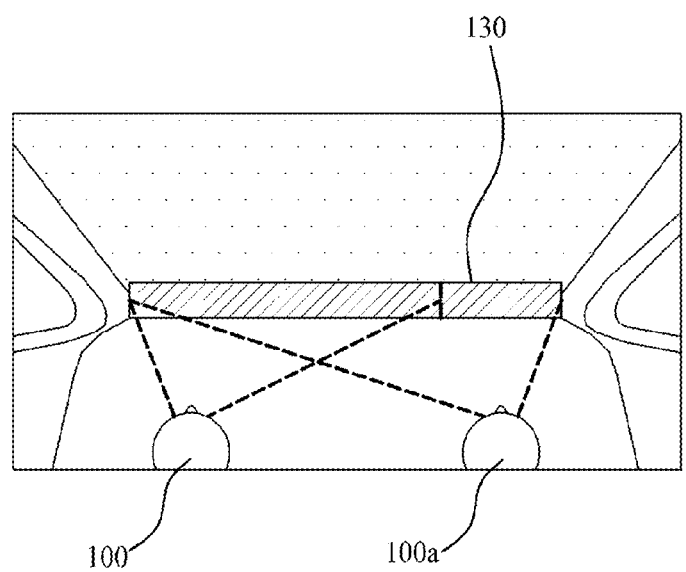

FIG. 14 illustrates a viewing angle blocking member in the bar type display apparatus according to the embodiment of the present invention, FIG. 15A illustrates a viewing angle area of a driver and a viewing angle blocking area of a driver by the viewing angle blocking member shown in FIG. 14. FIGS. 15B and 15C illustrate a viewing angle area of a passenger by the viewing angle blocking member shown in FIG. 14.

Referring to FIGS. 9 and 14, the viewing angle blocking member 137 according to one example is attached to the bar type display apparatus 130, that is, a front surface of the display panel 133a, to thereby block a viewing angle of a driver 100. To this end, the viewing angle blocking member 137 according to one example may include a first blocking area 137a and a second blocking area 137b.

The first blocking area 137a may be defined by a first display area of the display module corresponding to the front of the passenger seat (PS, See FIG. 2). A first blocking pattern (not shown) is prepared in the first blocking area 137a by a surface treatment process. As shown in FIG. 15A, the first blocking pattern blocks the viewing angle of a driver 100 for the first display area of the display module, to thereby minimize dispersion of a driver's gaze.

The second blocking area 137b may be defined by a second display area of the display module corresponding to the remaining on the front of the display module except the front of the passenger seat (PS, See FIG. 2). A second blocking pattern (not shown) is provided in the second blocking area 137b by a surface treatment process, wherein the second blocking pattern is different from the first blocking pattern. As shown in FIG. 15B, the second blocking pattern blocks the viewing angle of a passenger 100a for the second display area of the display module. Accordingly, the different images may be respectively displayed on the first and second display areas of the display module 133 through the use of viewing angle blocking member 137. Especially, when the vehicle is driven, the different images may be displayed on one display screen, that is, the different images may be respectively provided to a driver 100 and a passenger 100a.

Additionally, since a passenger 100a does not drive the vehicle, there is no need for blocking the viewing angle of a passenger 100a for the second display area of the display module. Accordingly, it is possible to omit the second blocking area 137b of the viewing angle blocking member 137. In this case, as shown in FIG. 15C, a passenger 100a may watch an entire screen of the display module.

Figure 16:
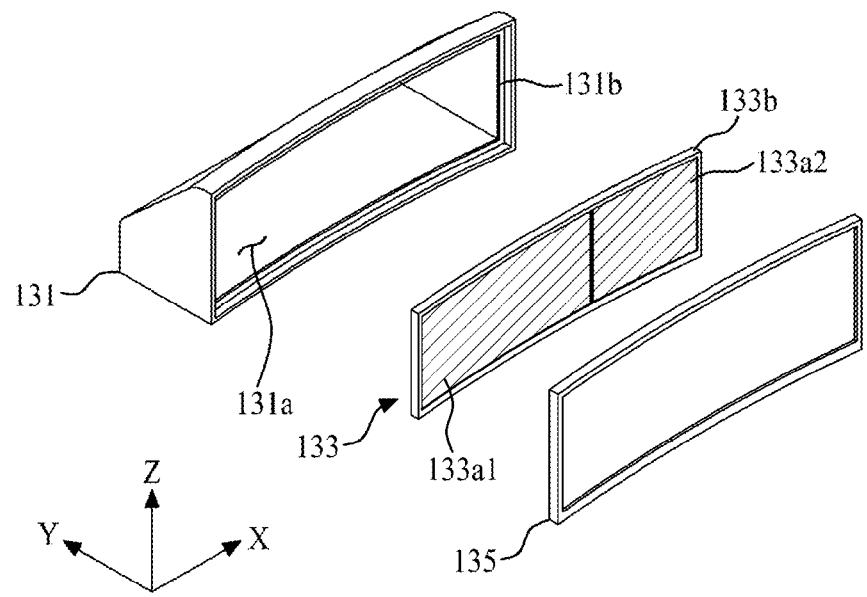
FIG. 16 is an exploded perspective view illustrating a bar type display apparatus according to another embodiment of the present invention.

FIG. 16 is a perspective view illustrating a bar type display apparatus according to another embodiment of the present invention, which is obtained by changing a structure of a display module. Hereinafter, only the display module will be described in detail as follows.

The display module 133 according to another embodiment of the present invention may include a first display panel 133a1 and a second display panel 133a2.

The first display panel 133a1 corresponds to a screen for a driver, whereby information for a driving is displayed on the first display panel 133a1. The first display panel 133a1 may be a liquid crystal display panel or an organic light emitting display panel. Additionally, a passenger as well as a driver may watch an image displayed on the first display panel 133a1.

The second display panel 133a2 corresponds to a screen for a passenger, whereby an image for a passenger is displayed on the second display panel 133a2. In the same manner as the first display panel 133a1, the second display panel 133a2 may be a liquid crystal display panel or an organic light emitting display panel. The second display panel 133a2 includes a viewing angle blocking member capable of blocking a driver's watching so that it is possible to minimize dispersion of a driver's gaze.

A screen size of the first display panel 133a1 may be relatively larger than a screen size of the second display panel 133a2.

Figure 17:
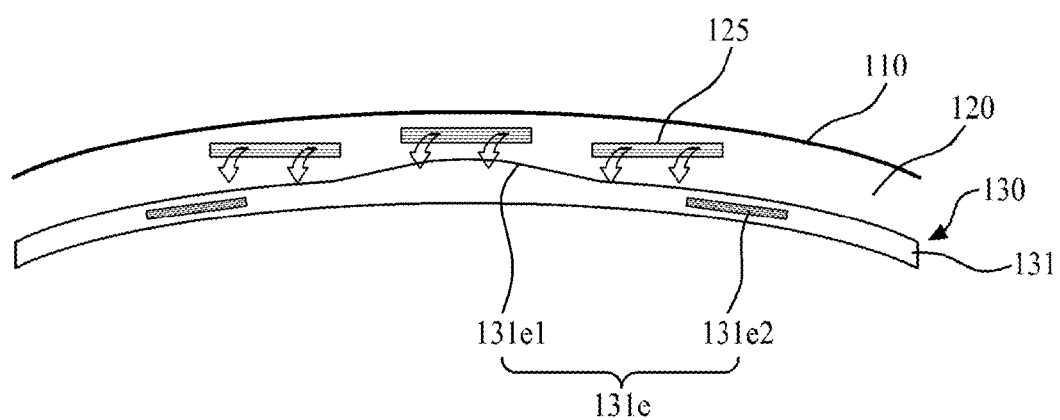
FIG. 17 illustrates a housing according to another example in the bar type display apparatus according to the embodiment of the present invention.

FIG. 17 illustrates a housing according to another example in the bar type display apparatus according to the embodiment of the present invention.

The vehicle with the bar type display apparatus according to one embodiment of the present invention may include a plurality of ventilation holes 125 prepared on the dashboard 120 between the front glass 110 and the bar type display apparatus 130. A low-temperature or high-temperature air is blowing in each of the plurality of ventilation holes 125 by an air-conditioning system of the vehicle.

The housing 131 according to another example is provided on the upper surface of the dashboard 120 so as not to cover the plurality of ventilation holes 125. In this case, a rear surface 131e of the housing 131 has a streamlined shape so as not to interrupt a flow of air blowing from the ventilation hole 124. That is, if the housing 131 is spaced from the ventilation hole 124 in order to prevent the ventilation hole 125 from being covered by the housing 131, a driver's front viewing angle may be partially obstructed by the bar type display apparatus 130. In order to overcome this problem, the rear surface 131e of the housing 131 has a bisymmetrical streamlined shape according as central portion 131e1 of the rear surface 131e is convexly protruding toward the front glass 110. Thus, the bar type display apparatus 130 is provided adjacent to the ventilation hole 125 within a range of not covering the ventilation hole 125 so that it enables a smooth flow of air blowing from the ventilation hole 125.

Additionally, a plurality of heat-radiation pass holes 131e2 may be prepared in the rear surface 131e of the housing 131. The plurality of heat-radiation pass holes 131e2 may be provided along a length direction of the bar type display apparatus 130, or a height direction of the bar type display apparatus 130. The plurality of heat-radiation pass holes 131e2 may provide an air circulation pass for circulation of heat generated in the inside of the bar type display apparatus 130 and applied by sunlight, to thereby improve reliability of the bar type display apparatus 130.

Figure 18A:
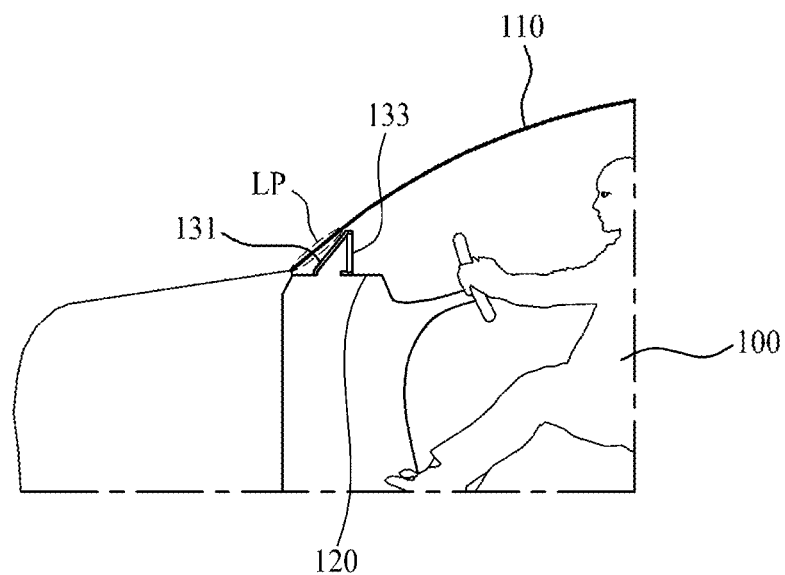
FIG. 18A illustrate a vehicle with the bar type display apparatus according to another embodiment of the present invention.
Figure 18B:
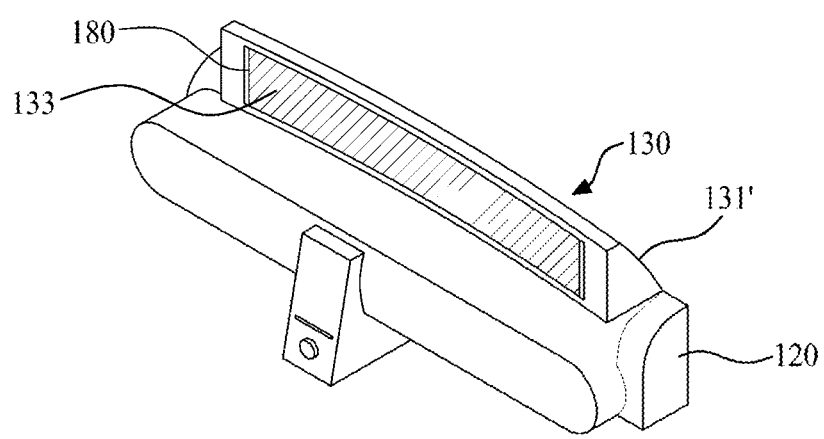
FIG. 18B illustrates an embedded dashboard in the bar type display apparatus according to one embodiment of the present invention.
Figure 18C:
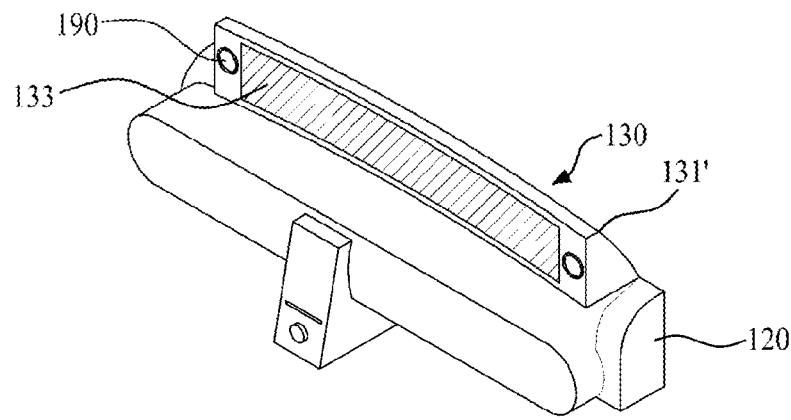
FIG. 18C illustrates an embedded dashboard in the bar type display apparatus according to another embodiment of the present invention.

FIG. 18A illustrates the vehicle with the bar type display apparatus according to another embodiment of the present invention. FIG. 18B illustrates the embedded dashboard of the bar type display apparatus according to one embodiment of the present invention. FIG. 18C illustrates the embedded dashboard of the bar type display apparatus according to another embodiment of the present invention.

Referring to FIGS. 18A and 18B, the vehicle with the bar type display apparatus according to another embodiment of the present invention may include the bar type display apparatus 130 embedded in the dashboard 120, which is adjacent to the lower portion (LP) of the front glass 110.

The bar type display apparatus 130 extends from one edge (S1) of the dashboard 120 to the other edge (S2) of the dashboard 120 where the bar type display apparatus 130 includes the housing 131' and the display module 133.

The housing 131' is protruding from the upper surface of the dashboard 120 being adjacent to the lower portion (LP) of the front glass 110 where the housing 131' has the receiving space for receiving the display module 133 therein. Except that the housing 131' and the dashboard 120 are formed as one body, the structure of the housing 131' shown in FIG. 18A is the same as the structure of the housing 131 in the bar type display apparatus according to one embodiment of the present invention, whereby a detailed description for the same parts will be omitted.

The display module 133 is received in the receiving space of the housing 131', whereby the display module 133 is embedded in the dashboard 120. Accordingly, it is possible to realize a good interior design effect in the upper surface of the dashboard 120.

At least one speaker 180 facing the driver seat and/or passenger seat may be provided in at least one side of the display module 133.

Instead of the speaker 180 provided in at least one side of the display module 133, shown in FIG. 18C, a speaker 190 facing the driver seat and/or passenger seat may be provided at one side of the front surface or the other side of the front surface of the housing 131'.

Figure 19:
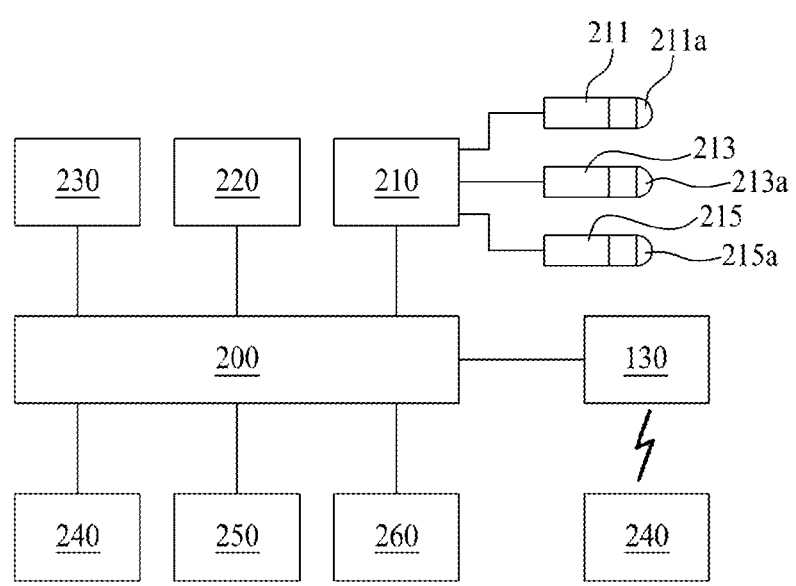
FIG. 19 is a block diagram illustrating a host system in the vehicle with the bar type display apparatus according to another embodiment of the present invention.

FIG. 19 is a block diagram illustrating a host system in the vehicle with the bar type display apparatus according to another embodiment of the present invention. Referring to FIG. 19, the host system 200 according to one example may display various information, which is supplied from a drive assistant system provided in the vehicle, on the bar type display apparatus 130, that is, the screen of display module, whereby various information may be displayed on one screen. For example, the drive assistant system may be at least one among an outside camera 210, a driving image recording apparatus 220, a navigation apparatus 230, a mobile user terminal 240, an audio/video apparatus 250, a and vehicle driving recording apparatus 260.

The outside camera 210 may include at least one among a side camera 211 provided in a side mirror of the vehicle, a front camera 213 provided in the front of vehicle, and a rear camera 215 provided at the rear of vehicle 215. In this case, the cameras 211, 213 and 215 photograph the environment at an angle of 180° or more than 180° by the use of fisheye lens, and provides the photographed real-time image to the host system 200.

The driving image recording apparatus 220 is referred to as a black box which photographs images of the front and/or rear sides of the vehicle driven or parked, and records the photographed images. Additionally, the driving image recording apparatus 220 may provide the photographed images to the host system 200 in real-time.

The navigation apparatus 230 provides road guide information (route description) to a user. The navigation apparatus 230 provides the road guide information such as route information for a user's destination, and driving route information to the host system 200.

The mobile user terminal 240 corresponds to a communication terminal of a driver, for example, a smart phone. The mobile user terminal 240 provides information about information of executing a preset application, a text service, and a social network service to the host system 200 by a short-range wireless communication method. That is, the host system 200 is interlocked with the mobile user terminal 240, whereby information executed in the mobile user terminal 240 is displayed on the screen of the display module.

The audio/video apparatus 250 provides audio information and/or video information to the host system 200 in accordance with a driver's operation.

The vehicle driving recording apparatus 260 provides on-board diagnostics (OBD) information to the host system 200.

As shown in FIG. 2, the host system 200 according to one example may divide the screen of the bar type display apparatus 130 into several areas, and respectively display the images 201 and 202 photographed on the left and right of the vehicle by the side camera 211, driving speed information 203 from the vehicle driving recording apparatus 260, and road guide information 204 from the navigation apparatus 203 on the divided areas at the same time.

Figure 20:
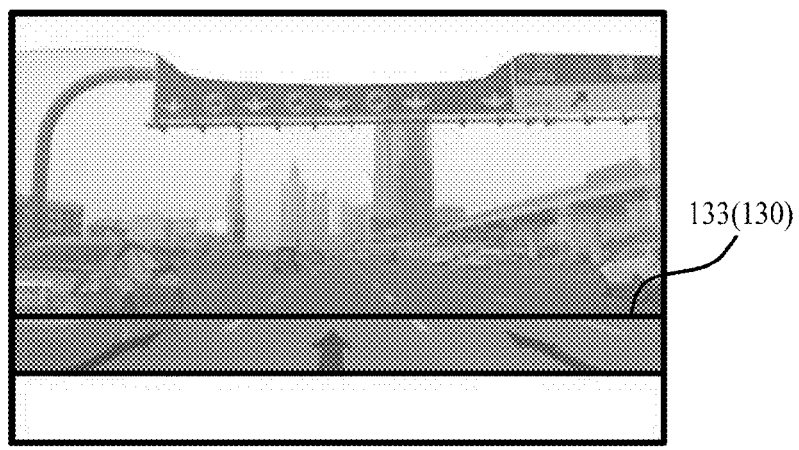
FIG. 20 illustrates augmented reality displayed on a screen of a display module in the bar type display apparatus according to the embodiment of the present invention.

As shown in FIG. 20, the host system 200 according to another example may display the image of the area ahead the vehicle, which is photographed by the front camera 213, on the screen of the display module 133 in a method based on augmented reality; or may match the road guide information from the navigation apparatus 230 and the image of the area ahead the vehicle, which is photographed by the front camera 213, at a ratio of 1 to 1, and display the road guide information and the image of the area ahead the vehicle on the screen of the display module 133 in a method based on augmented reality, so that it is possible to provide the optimal road guide to a user.

Additionally, the bar type display apparatus 130 receives and displays the information of the mobile user terminal 240 provided from the host system 200, but not limited to this method. The bar type display apparatus 130 may receive and display the information about the mobile user terminal 240 by a direct wireless communication with the mobile user terminal 240.

The bar type display apparatus 130 according to a modified embodiment of the present invention may include a wireless communication module (not shown) for a wireless communication with the mobile user terminal 240. For example, as shown in FIG. 19, the mobile user terminal 240 directly wireless-communicates with the bar type display apparatus 130 through a smart mirroring function, and transmits information selected by a user to the bar type display apparatus 130. The bar type display apparatus 130 receives the information from the mobile user terminal 240 through the wireless communication module, and displays the received information on the screen. In this case, a user executes an application of navigation, internet, video playing, gallery or music, and transmits screen information of the executed application to the bar type display apparatus 130.

According to one example, as shown in FIG. 2, the bar type display apparatus 130 according to the modified embodiment of the present invention directly receives the road guide information 204 from the navigation application of the mobile user terminal 240 through the smart mirroring function, and displays the received information on the screen of the bar type display apparatus 130.

According to another example, the bar type display apparatus 130 according to the modified embodiment of the present invention directly receives the road guide information from the navigation application of the mobile user terminal 240 through the smart mirroring function, receives the image of the area ahead the vehicle, which is photographed by the front cover 213, from the host system, and matches the road guide information and the image of the area ahead the vehicle at a ratio of 1 to 1 and displays the road guide information and the image of the area ahead the vehicle on the screen of the display module 133 in a method based on augmented reality, as shown in FIG. 20, so that it is possible to provide the optimal road guide to a user.

Figure 21:
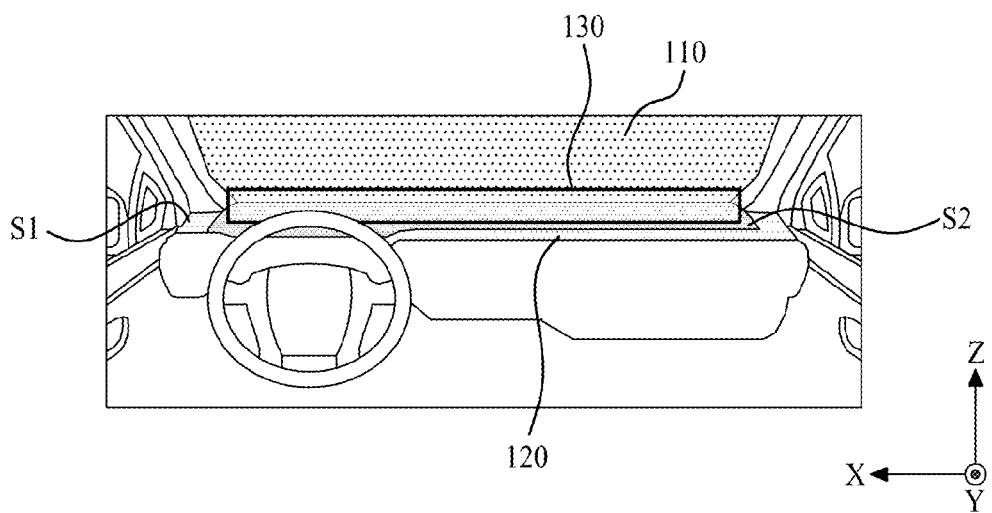
FIG. 21 illustrates the interior of the vehicle with the bar type display apparatus according to another embodiment of the present invention.

Additionally, the bar type display apparatus 130 according to another embodiment of the present invention may be transparent, as shown in FIG. 21. That is, the bar type display apparatus 130 according to another embodiment of the present invention may be formed of a transparent display apparatus, and may be disposed on the dashboard 120 being adjacent to the lower portion of the front glass 110. In case of the transparent bar type display apparatus 130 according to another embodiment of the present invention, it does not serve as an obstacle of a safe driving when the image is not displayed on the screen. Even when the image is displayed on the screen, information needed for driving is effectively provided to a driver without obstruction of the front viewing area of a driver. To this end, the bar type display apparatus 130 according to another embodiment of the present invention includes the housing 131, the display module 133 and the front cover 135, which are shown in FIG. 9. Each of the housing 131, the display module 133 and the front cover 135 may be formed of a transparent material.

According to the present invention, various types of information needed for driving may be provided to a driver without obstructing the front viewing area of a driver.

Also, it is possible to realize the improved or restricted viewing angle in the vertical and horizontal directions.

In addition, the image is directly displayed through the use of liquid crystal display panel or organic light emitting display panel. Accordingly, it enables more improved outside visibility, wider viewing angle and better resolution and luminance, so that it is possible to realize superior information delivery and to minimize visibility based on environmental impact (weather, in case of operating the wiper).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A vehicle comprising a bar shaped display apparatus provided on a dashboard and disposed adjacent to a lower portion of a front glass,
   wherein the bar shaped display apparatus extends from one edge of the dashboard to another edge of the dashboard that is opposite to the one edge of the dashboard;
   wherein:
   the bar shaped display apparatus has a maximum short side length of 200 mm, and a long side length corresponding to at least 3 times of the short side length, and
   a maximum long side length of the bar shaped display apparatus is set to be less than a length of the lower portion of the front glass.

2. The vehicle according to claim 1, wherein the bar shaped display apparatus is disposed in a front non-viewing angle area between the lower portion of the front glass and the dashboard.

3. The vehicle according to claim 1, wherein the bar shaped display apparatus has a concaved screen.

4. The vehicle according to claim 1, wherein the bar shaped display apparatus includes at least one display panel.

5. The vehicle according to claim 4, wherein the bar shaped display apparatus is transparent.

6. The vehicle according to claim 1, further comprising:
   a front camera for photographing an image of an area ahead the vehicle and lanes; and
   a host system for displaying the image of the area ahead the vehicle and the lanes captured by the front camera on the bar shaped display apparatus by a method based on augmented reality.

7. The vehicle according to claim 1, further comprising:
   a front camera for capturing an image of an area ahead the vehicle and lanes; and
   a host system for providing the image of the area ahead the vehicle and the lanes captured by the front camera to the bar shaped display apparatus,
   wherein the display module receives road guide information from a mobile user terminal, matches the received road guide information with the image of the area ahead the vehicle, and displays the matched images by a method based on augmented reality.

8. The vehicle according to claim 1, further comprising a ventilation hole on the dashboard between the front glass and the bar shaped display apparatus.

9. The vehicle according to claim 1, further comprising a viewing angle control unit for controlling a viewing angle by tilting the bar shaped display apparatus,
   wherein the viewing angle control unit includes:
   a plate for supporting the bar shaped display apparatus;
   a receiving frame on the dashboard for receiving the plate;
   an illumination sensor prepared in the bar shaped display apparatus; and
   a driving member for tilting the plate based on an illumination sensed by the illumination sensor.

10. The vehicle according to claim 1, further comprising:
    a plate for supporting the bar shaped display apparatus;
    a receiving frame for receiving the plate;
    a hinge member, which is provided in the receiving frame, for rotatably supporting the plate; and
    an operation lever, which is connected with the hinge member through the receiving frame, for tilting the plate in accordance with a users operation.

11. The vehicle according to claim 1, wherein the bar shaped display apparatus further includes a display module, and a viewing angle blocking film attached to a front of the display module,
    wherein the viewing angle blocking film has a blocking area for blocking a viewing angle of a driver in a display area of the display module corresponding to a front of a passenger.

12. A vehicle comprising:
    a bar shaped display apparatus provided on a dashboard and disposed adjacent to a lower portion of a front glass, wherein the bar shaped display apparatus extends from one edge of the dashboard to another edge of the dashboard that is opposite to the one edge of the dashboard;
    a ventilation hole on the dashboard between the front glass and the bar shaped display apparatus;
    wherein the bar shaped display apparatus further includes a display module, and a housing on the dashboard for receiving the display module,
    wherein a rear surface of the housing has a streamlined shape to avoid the ventilation hole.

13. The vehicle according to claim 12, wherein the housing protrudes from an upper surface of the dashboard, which is adjacent to the lower portion of the front glass, so as to have a receiving space for receiving the display module.

* * * * *